(12) United States Patent
Priepke et al.

(10) Patent No.: US 7,690,439 B2
(45) Date of Patent: Apr. 6, 2010

(54) AUTOMATIC LATCH FOR THREE POINT HITCH QUICK COUPLER AND PTO CONNECTION MODULE

(75) Inventors: Edward H. Priepke, Lancaster, PA (US); Douglas S. Fitzkee, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/610,931

(22) Filed: Dec. 14, 2006

(65) Prior Publication Data

US 2008/0142231 A1    Jun. 19, 2008

(51) Int. Cl.
*A01B 59/043* (2006.01)
(52) U.S. Cl. .................. 172/47; 172/439; 180/53.3
(58) Field of Classification Search ............. 172/47, 172/439, 272, 275; 180/53.3, 53.6, 53.61, 180/53.62, 53.7
See application file for complete search history.

(56) References Cited

U.S. PATENT DOCUMENTS

| | | | |
|---|---|---|---|
| 1,060,441 A | | 4/1913 | Engel |
| 1,437,836 A | | 12/1922 | Ferris |
| 2,381,633 A | | 8/1945 | Young |
| 2,429,761 A | | 6/1947 | Ketel |
| 2,559,962 A | | 7/1951 | Hudson |
| 2,636,568 A | * | 4/1953 | Rutishauser ............... 180/53.1 |
| 2,979,137 A | * | 4/1961 | Hess ......................... 172/272 |
| 3,007,535 A | * | 11/1961 | Lippke ...................... 180/14.1 |
| 3,074,501 A | * | 1/1963 | Lane et al. ................. 180/14.1 |
| 3,078,106 A | * | 2/1963 | Pedersen .................... 172/439 |
| 3,283,840 A | * | 11/1966 | Lane ......................... 180/14.1 |
| 3,512,804 A | * | 5/1970 | Siegert ....................... 280/509 |
| 3,528,694 A | | 9/1970 | Harley |
| 4,074,639 A | * | 2/1978 | Hodgson .................... 111/123 |
| 4,090,725 A | * | 5/1978 | Perin ......................... 172/272 |
| 4,158,996 A | | 6/1979 | Marulic et al. |
| 4,176,727 A | | 12/1979 | Perin |
| 4,433,767 A | * | 2/1984 | Thor ........................ 192/69.61 |
| 4,492,292 A | * | 1/1985 | Thor ........................ 192/69.91 |
| 4,799,563 A | * | 1/1989 | Yukino ....................... 180/14.4 |
| 4,884,639 A | * | 12/1989 | Nozaka et al. ................ 172/47 |
| 4,887,680 A | * | 12/1989 | Nozaka et al. ............. 180/53.3 |
| 4,934,471 A | * | 6/1990 | Tanaka et al. .............. 180/14.4 |
| 4,944,354 A | | 7/1990 | Langen et al. |
| 4,968,054 A | | 11/1990 | Jakob |
| 5,031,927 A | | 7/1991 | Frenette |
| 5,240,274 A | | 8/1993 | Blacklaw |
| 5,244,047 A | | 9/1993 | Eudy |
| 5,257,796 A | | 11/1993 | Thorwall et al. |
| 5,303,790 A | * | 4/1994 | Coleman .................... 180/53.3 |
| 5,657,825 A | * | 8/1997 | Englund ..................... 172/439 |
| 5,667,330 A | * | 9/1997 | Henkel et al. ............... 403/328 |

(Continued)

*Primary Examiner*—Robert E Pezzuto
*Assistant Examiner*—Matthew D Troutman
(74) *Attorney, Agent, or Firm*—Patrick M. Sheldrake; John William Stader; Michael G. Harms

(57) ABSTRACT

An automatically actuating apparatus for engaging an implement to an ASAE S278.6 three-point hitch quick coupler utilizing a pivoting motion about an upper hitch point and an automatic latching mechanism to engage and retain lower hitch pins that simplifies connection of an implement. The mechanism also includes a mechanism for automatically engaging the PTO driveline between a tractor and a powered implement as the implement is engaged with the hitch.

11 Claims, 9 Drawing Sheets

U.S. PATENT DOCUMENTS

| | | |
|---|---|---|
| 5,713,691 A | 2/1998 | Solberg |
| 5,984,019 A | 11/1999 | Hund |
| 6,155,616 A | 12/2000 | Akright |
| 7,220,075 B2 * | 5/2007 | Herchenbach et al. ........ 403/57 |
| 7,278,502 B2 * | 10/2007 | Trefz et al. ................. 180/53.1 |

* cited by examiner

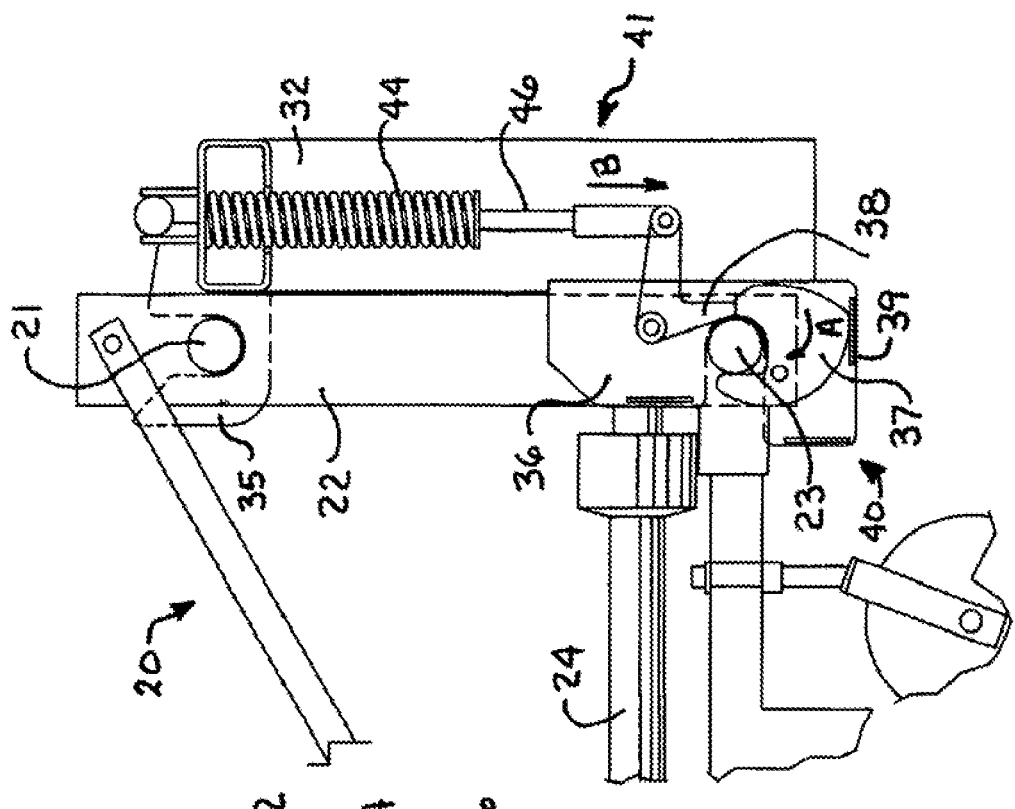
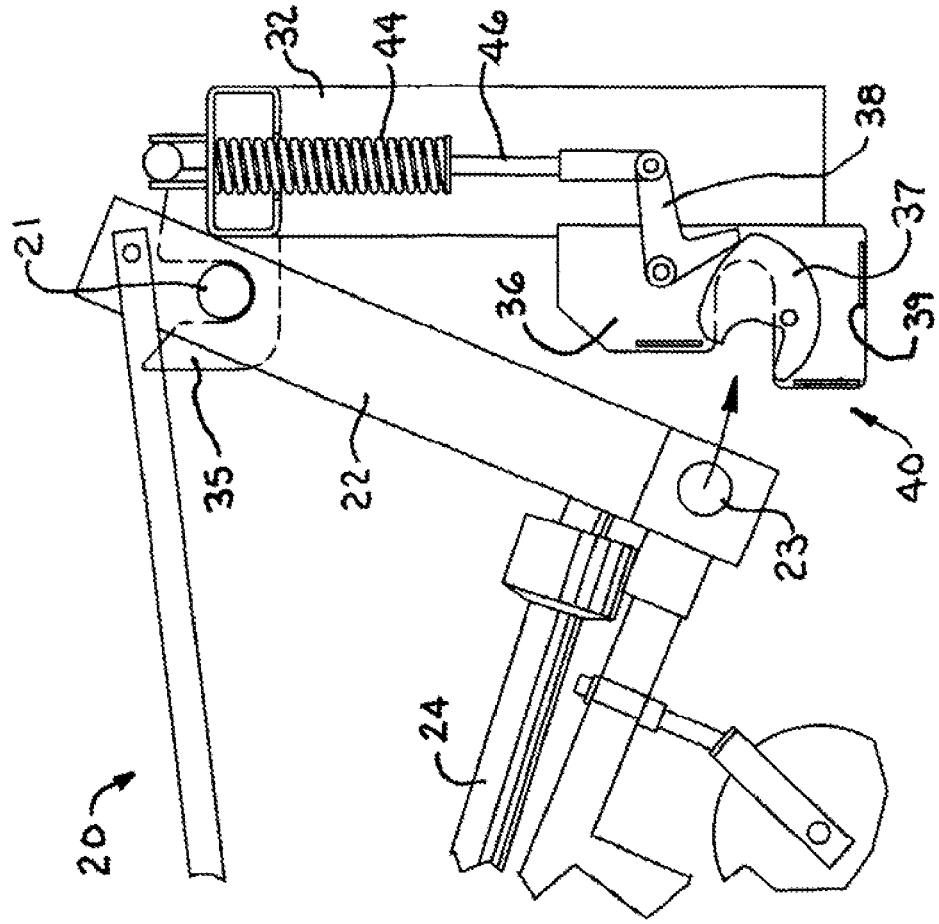

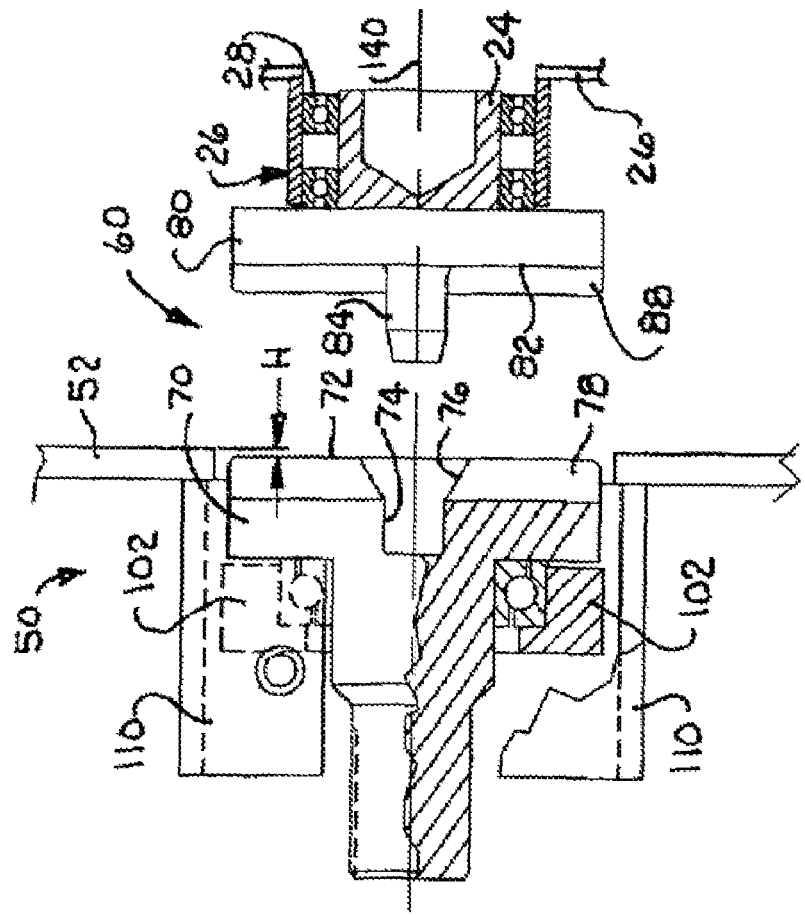
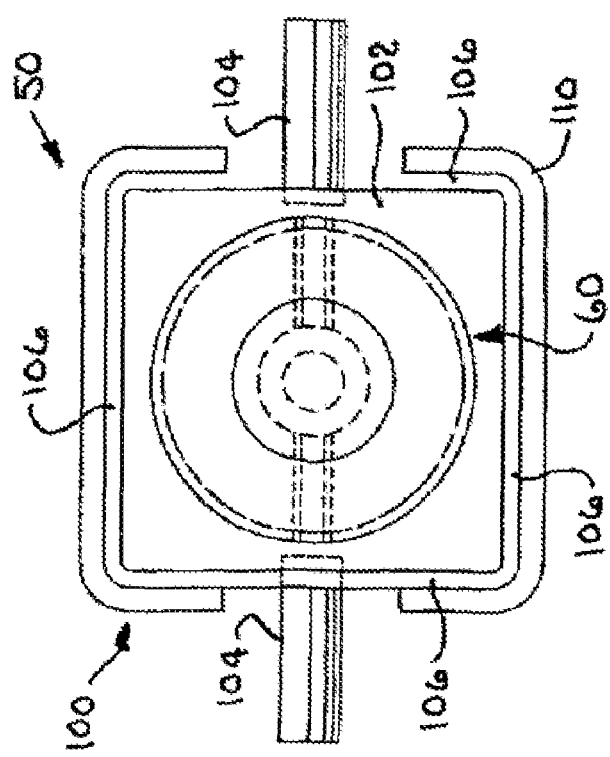
FIG. 9
FIG. 8

AUTOMATIC LATCH FOR THREE POINT HITCH QUICK COUPLER AND PTO CONNECTION MODULE

BACKGROUND OF THE INVENTION

The present invention relates generally to coupling devices for connecting a tractor or other similar prime mover to a hitch-mounted implement, and more particularly to a quick-attaching coupler and power takeoff apparatus for automatically coupling a hitch-mounted implement and engaging the power takeoff.

Quick attaching couplers have been developed to allow faster attachment of hitch mounted implements to a tractor. Many quick attaching couplers comprise an inverted U-shape arched frame that is attached to the conventional three pivot points of a tractor hitch. The quick attaching coupler frame includes an upper hook with a long, tapered point and two lower coupling hooks or jaws with a latching and unlatching arrangement to hold the implement hitch pins. To couple an implement using the quick coupler, the coupler is lowered by positioning the tractors three point hitch and the tractor positioned near the implement with the coupling hooks adjacent the implement hitching pins. Then the hitch and connected quick coupler is then raised with the tractor hydraulic system so that the upper hook begins to engage the upper pin on the implement Further lifting, assuming all three connection points are aligned, causes the weight of the implement to force the lower hitch pins to enter the lower hooks where they may be latched in place by the tractor operator to secure the implement.

The latches may be spring loaded to the locked or latched position. Locking the latches may be accomplished by having the operator dismount the tractor seat to manually operate two locking mechanisms for the two hitch pins. Some quick attaching couplers incorporate one or more levers that enable the operator to remain seated on the tractor while locking the latches.

Tractors may be equipped with a power take off (hereinafter "PTO") drive that provides a mechanism for transmitting rotary power from the engine to implements that are coupled to a tractor The PTO is most commonly a rotating splined shaft which projects rearwardly from the rear of the tractor frame for a short distance; however, some tractors have auxiliary PTO shafts at other locations, such as at the front of the tractor. The direction of rotation, rotational speed, approximate location and exact dimensions of the PTO shaft are standardized to provide the ability to interchange between power shafts of various implements made by different manufacturers. The PTO shaft of a tractor is typically driven at either 540 rpm or 1,000 rpm. It is well understood in this field of invention that the PTO shaft rpm varies with engine speed and the rotational speeds of 540 rpm and 1,000 rpm are typically the standard "rated" speeds for PTO driven implements. Although the PTO described herein projects rearwardly from the tractor, it should be appreciated that the invention described relates to any PTO, regardless of location on a prime mover.

Most hitch-mounted implements have a driveline comprised of a telescoping, splined drive shaft which can be extended to connect at one end to the splined interface of the tractors PTO while the other end connects to the rotary input connection (typically a gearbox input) for the implement. The driveline typically includes two or more universal or constant velocity joints, or the like, to allow angular movement of the implement and tractor relative to one another without binding the driveline.

Connecting the PTO driveline assembly to the tractor PTO can be cumbersome, especially in the case of three point hitch-mounted implements which may have limited accessibility to the PTO connection area. The object of a quick attaching coupler is to simplify the process of connecting an implement to a tractor hitch; however, requiring an operator to manually connect the PTO imposes a sometimes difficult and time-consuming task in the hitching process thereby diminishing some benefits of the quick attaching coupler. Connecting the driveline generally requires that the implement drive shaft be lifted into position for engaging the PTO splined connection. The drive shaft must often be manually rotated to align the splines while simultaneously holding the weight of the driveline assembly. This task is time consuming dirty, and often difficult for the operator, particularly if he/she is of small physical stature or handicapped. Performing the task may also increase the potential for operator injury.

It would be desirable to provide an apparatus that would simplify the connection of an implement to a quick coupler and automatically engage a PTO connection simultaneous with engagement of the quick connecting hitch latching mechanism.

SUMMARY OF THE INVENTION

Accordingly, it is an object of the present invention to provide an ASAE S278.6 three-point hitch quick coupler that automatically engages the latches securing an implement to the quick coupler as the implement is being connected to the coupler.

It is another object of the present invention to provide an ASAE S278.6 three-point hitch quick coupler that requires manual alignment of only one hitching point in order to engage an implement. Once a first point is aligned, the present invention automatically aligns and engages the remaining two hitching points by simply raising the tractor hitch.

It is another object of the present invention to provide an ASAE S278.6 three-point hitch quick coupler that automatically engages the PTO driveline as a PTO-powered implement is being connected to the coupler.

It is a further object of the present invention to provide an improved implement hitching and PTO shaft connection apparatus that reduces the amount of time and level of physical difficulty required for connecting a PTO-powered, hitch-connected work implement to a tractor.

It is a further object of the present invention to provide an improved implement hitching and PTO shaft connection apparatus that may be operated without requiring the operator to dismount the tractor.

It is a further object of the present invention to provide an improved PTO driveline shaft connection apparatus that is self-aligning during engagement, thereby eliminating the need for the operator to manually position the driveline during the implement hitching operation.

It is a still further object of the present invention to provide an improved PTO driveline shaft connection apparatus that improves the ease of connecting a powered implement to a tractor PTO.

It is a still further object of the present invention to provide an improved implement hitching and PTO shaft connection apparatus that is durable in construction, inexpensive of manufacture, carefree of maintenance, easily assembled, and simple and effective to use.

These and other objects are achieved by providing an automatically actuating mechanism for engaging an implement to an ASAE S278.6 three-point hitch quick coupler that includes a mechanism for automatically engaging the PTO driveline between a tractor and a powered implement as the hitch is engaged.

BRIEF DESCRIPTION OF THE DRAWINGS

The advantages of this invention will be apparent upon consideration of the following detailed disclosure of the invention, especially when taken in con-junction with the accompanying drawings wherein:

FIG. 3 shows a side view of the automatic latching mechanism and an implement prepared for connection with the hitch;

FIG. 4 shows a side view of the automatic latching mechanism and with an implement connected to the hitch;

FIG. 8 is an elevation view of a portion of the torque coupling and the bearing housing structure;

FIG. 9 is a partial section view of the drive and driven portions of the torque coupling;

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
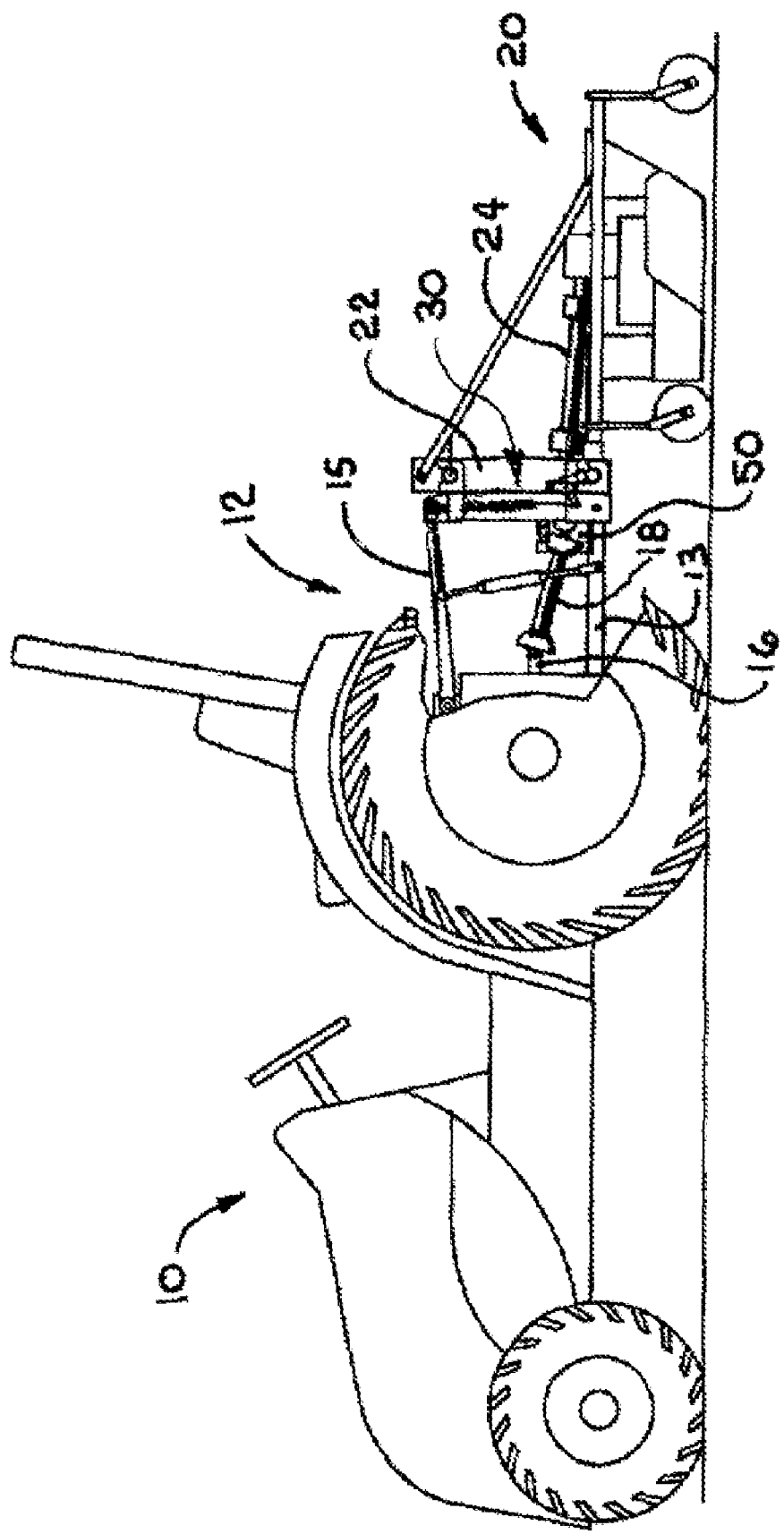
FIG. 1 is a diagrammatic side view of a tractor and a hitch-connected powered implement of the type on which the present invention is useful.

FIG. 1 shows tractor 10 having a three-point hitch 12 for selectively positioning a connected implement 20. Three-point hitch 12 includes lower lift arms 13 (only one shown) and upper link 15 which may be selectively raised and lowered with respect to the ground to position connected implement 20 at a desired height relative to the ground. Quick coupler 30 interposed between three-point hitch 12 and connected implement 20 to enable the implement 20 to be quickly connected to the tractor 10 with minimal operator effort. Quick couplers are well-known in the art, particularly those having design criteria set by ANSI standard ASAE S278.6 to assure compatibility among manufacturers. Implement 20 is attached to quick coupler 30 by implement hitch frame 22. As shown, implement 20 is a powered implement, such as a spreader, rotary mower, rotary tiller and the like, which receives rotary input power from tractor PTO 16. Rotary motion is transferred from the tractor PTO 16 to the implement via a PTO driveline comprising telescoping shaft 18, PTO connection module 50, and implement driveline 24.

Figure 2:
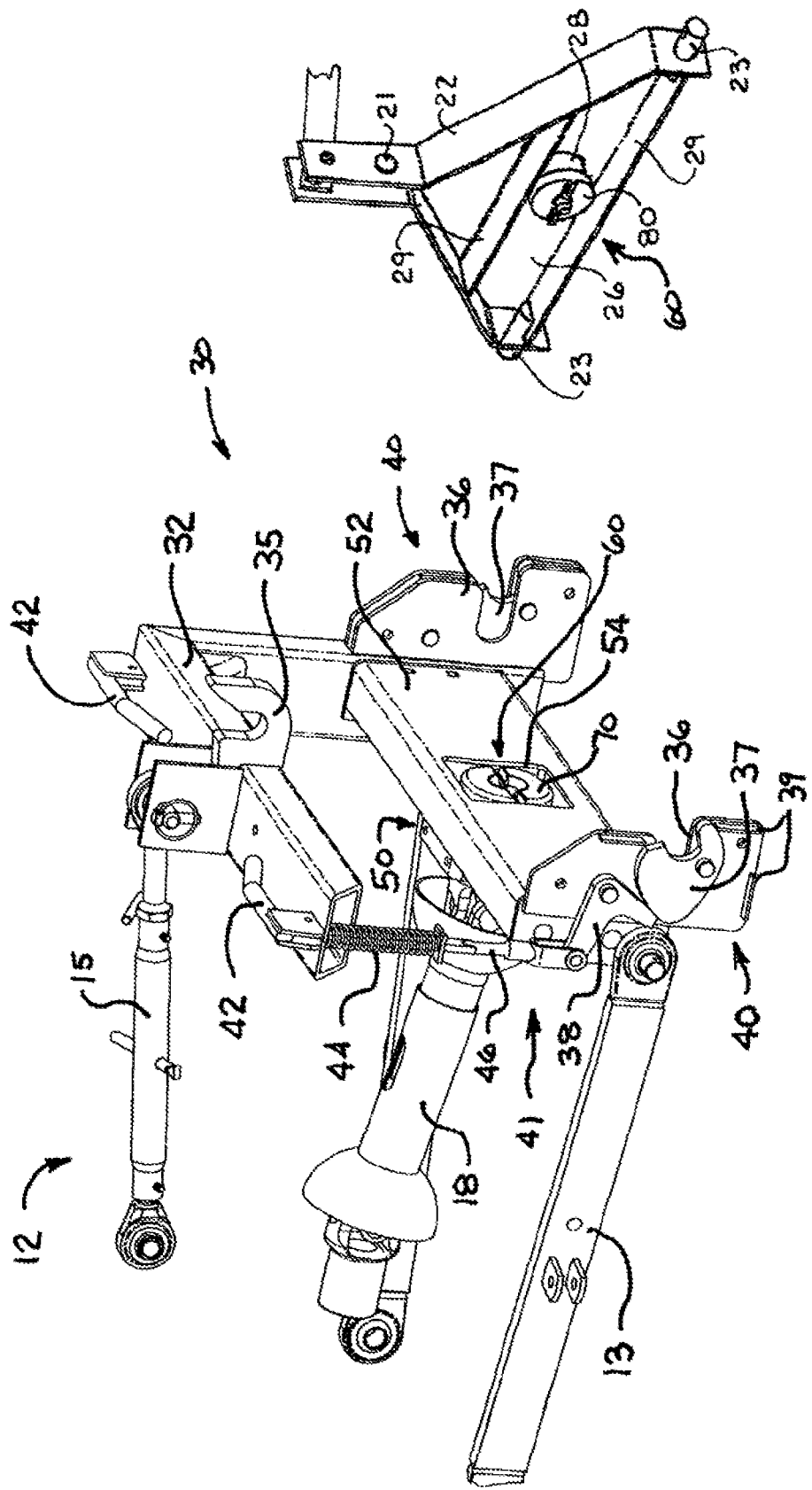
FIG. 2 is a partial perspective view of the invention showing the automatic latching mechanism as configured just prior to connecting an implement.
Figure 5:
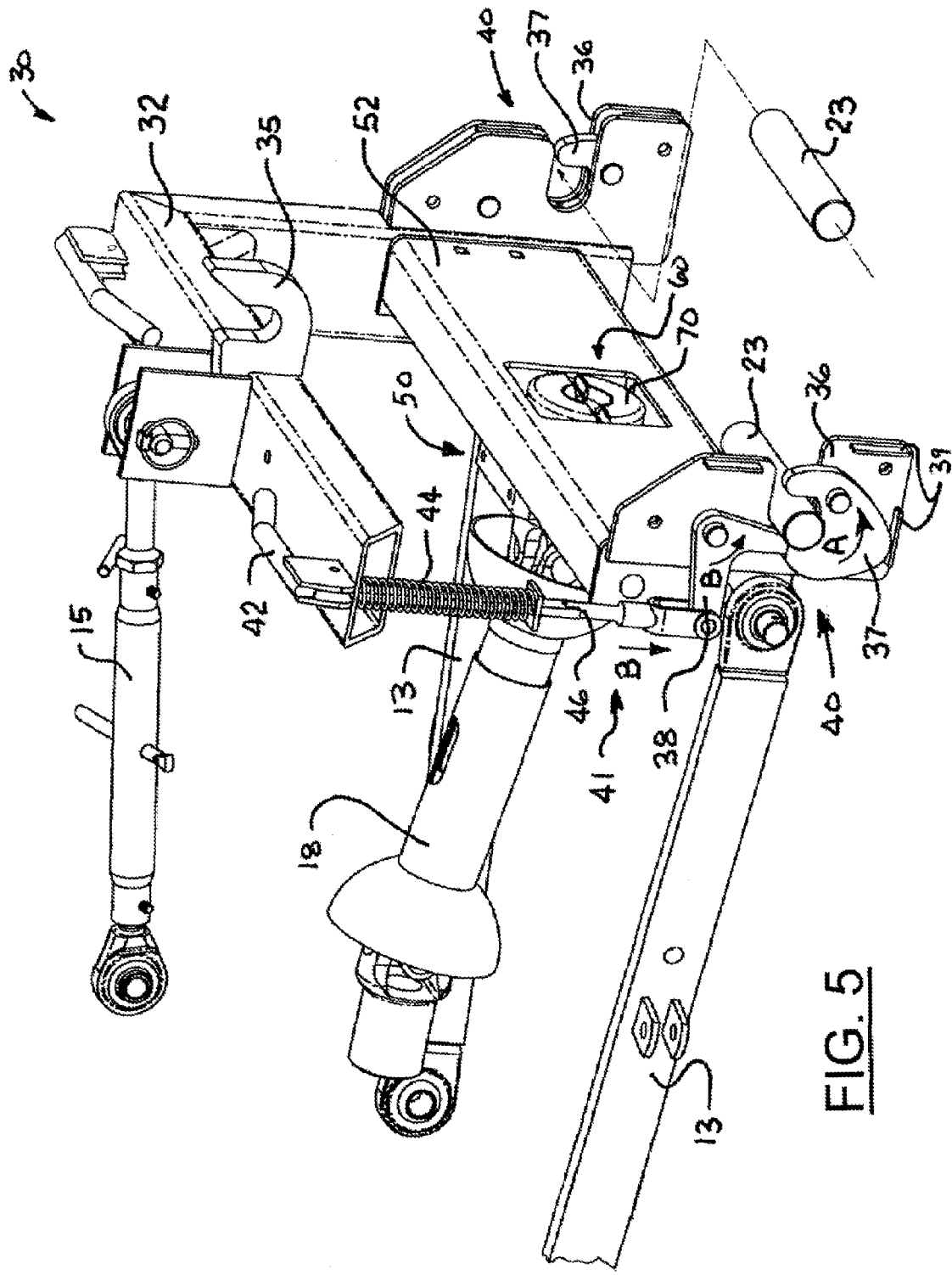
FIG. 5 is a partial perspective view of the invention showing the automatic latching mechanism as configured when an implement had been connected and the mechanism is fully engaged and latched.

Referring to FIG. 2, quick coupler 30 is shown having a main frame 32 which is generally an inverted U-shaped frame including spaced-apart connections for pivotable connection to the lower lift arms 13 and upper link 15 of the tractor's three-point hitch 12. As normally arranged when connected to a tractor hitch, the plane of the main frame 32 is generally transversely and vertically disposed with respect to the tractor, being adjacent to the tractor in one direction and adjacent to the implement in the opposite direction. Top hook 35 and a pair of releasable hitching mechanisms 40 are connected to the main frame 32 facing the implement 20 for engaging with implement top 21 and bottom hitch pins 23. The top hook 35 is connected to the cross member of the inverted U-shape portion of the main frame 32 while the releasable hitching mechanisms 40 are attached one on each opposing leg of the frame. Each releasable hitching mechanism 40 includes a bottom guide structure 36 housing a pivotally disposed rolling block 37 to secure the bottom hitch pins 23 of the implement in position, when engaged, to prevent the implement from inadvertently disconnecting from the quick coupler 30. Motion of the rolling blocks 37 is managed by a latching mechanism 41. Extreme limits of rolling block 37 motion are controlled by travel stops 39 which are integrated into the guide structure 36.

Also shown in FIG. 2, PTO connection module 50 is connected to a transverse frame 52 which in turn connects to and spans between the vertical side members of the main frame 32. Transverse frame 52 provides a mounting location for the drive member of a torque coupler 60 and the PTO connection module 50 of the invention (illustrated in FIGS. 5 through 9). An opening 54 in transverse frame 52 allows the PTO driveline to pass through the frame so rotational motion may be transferred from the tractor PTO to the implement driveline through the torque coupler 60. Transverse frame 52 may be connected to the main frame 32 using bolted connections or may be integral to the quick coupler main frame 32. Though shown as a structural member spanning between the vertical side members of the inverted U-shaped main frame, numerous structures are conceivable and capable of providing a rigid mounting location for the PTO connection module 50.

Implement frame 22 includes a transversely disposed driveline mounting structure 26 to provide a connection location for the implement driveline 24 (shown in FIG. 1) and the driven member 80 of the torque coupling 60. Implement driveline bearing 28 connects implement driveline 24 to the mounting structure 26. Implement driveline bearing 28 locates the driveline in both radial and axial directions, thereby maintaining the driven member 80 of the torque coupling in a generally fixed position relative to the implement frame 22. Mounting structure 26 may also include driveline shields 29 which create a recessed structure surrounding the torque coupling 60. As the implement 20 is connected to the tractor quick coupler 30, the drive shields 29 are positioned such that they extend toward and adjacent to the top and bottom portions of the transverse frame 52. The drive shields 29 form an enclosure around the torque coupling 60 consisting of the transverse frame 52, the driveline mounting structure 26, and the drive shields 29 which prevent inadvertent contact with the rotating torque coupling 60 during implement operation.

Figure 6:
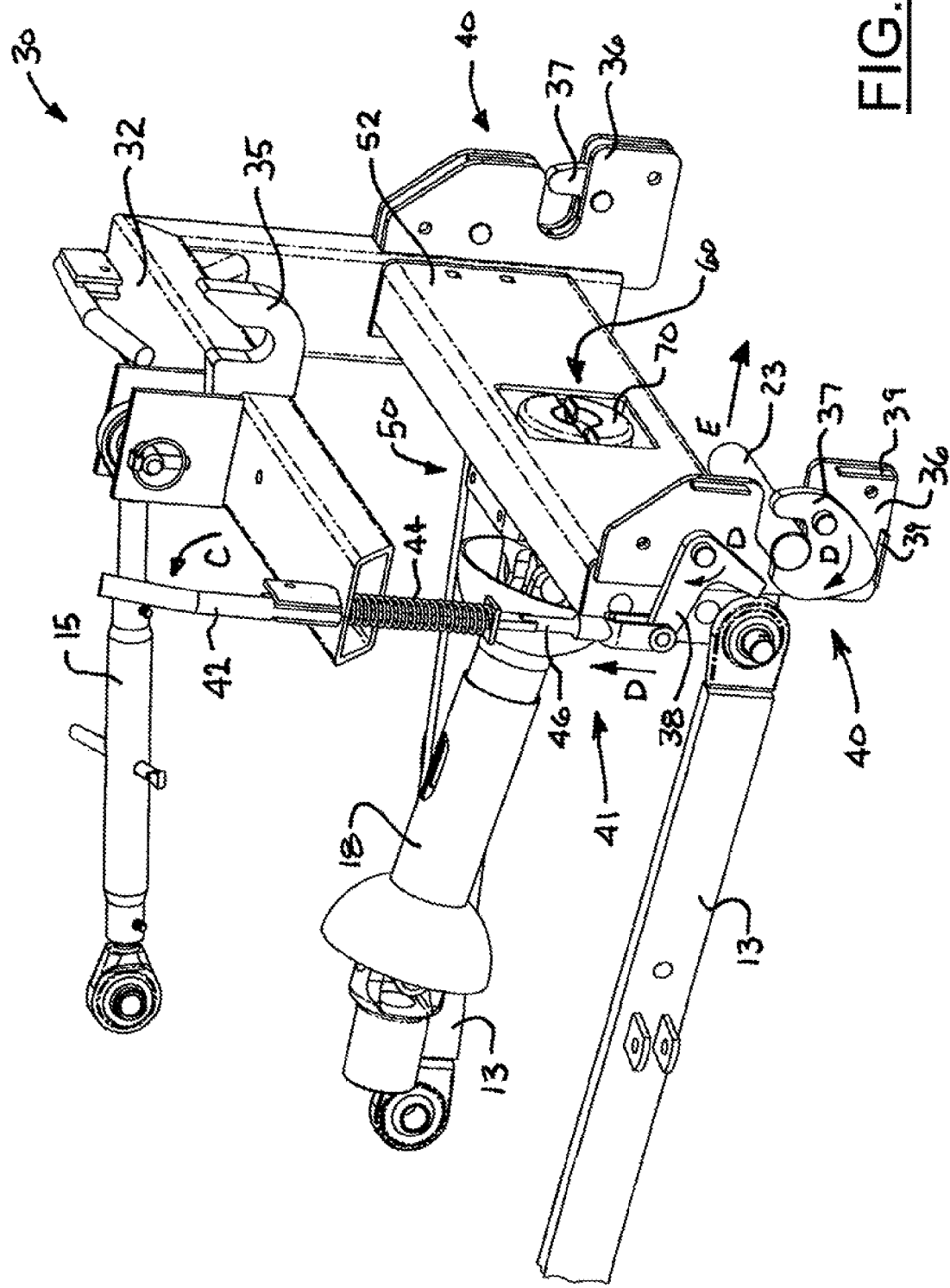
FIG. 6 is a partial perspective view of the invention showing the automatic latching mechanism as configured in preparation for disconnecting a connected implement.

Referring now to FIGS. 2 through 6 operation of the releasable hitching mechanism 40 is described. Each releasable hitching mechanism 40 comprises guide structure 36, pivotable rolling block 37, latching lever 42, latching spring 44, actuator rod 46, and latch 38. As shown in FIG. 2, the latching lever 42 is in the latched position and the rolling block 37 is in the released position. Latching lever 42 includes a cam-like profile and an offset pin connection for connection with actuator rod 46 so that movement of latching lever 42 between latched and unlatched positions allows movement of actuator rod 46 in upward and downward directions relating to released and engaged positions, respectively, of the rolling block 37. The cam-like profile of latching lever 42 is generally held in contact with the main frame 32 by latching spring 44. When latching lever 42 is positioned in the unlatched position as shown in FIG. 6, latching spring 44 is in a compressed condition and latch 38 is positioned to allow rolling block 37 to move between engaged and released positions relative to implement lower hitch pin 23.

Latch 38 is shown in FIGS. 2 and 3 in an intermediate position, prevented from moving into the latched position by the contour of the rolling block 37 when it is in the released position as would be the case when the coupler is prepared for implement connection, but still prior to coupling an implement. When the latching lever 42 in is the latched position, spring force from latching spring 44 is transmitted to latch 38 by actuator rod 46 to maintain latch 38 in contact with the outer contour of rolling block 37. Friction between latch 38 and rolling block 37 maintains rolling block 37 in the released position ready to receive the implement bottom hitch pins 23. Movement of rolling block 37 from released to engaged positions is caused by the force of the implement hitch pins 23 acting on the rolling block as the implement pivots about upper hitch pin 21 thereby moving implement bottom hitch pins into engagement with rolling block 37. When rolling block 37 is in the released position, as shown in FIGS, 2 and 3 its contour prevents complete pivoting of latch 38 into the latched position. As a result, actuator rod 46 is prevented from moving to its fully latched position, caused by the spring force in the latching spring 44, until rolling block 37 is repositioned to the engaged position.

Connecting an implement to the quick coupler 30 is simplified compared to manual connection to a conventional three-point hitch or even connection to known quick couplers As shown in FIGS. 3 and 4; coupling an implement using the present invention requires an operator only to engage the implement top pin 21 in the top hook 35 and then raise the three-point hitch. Upward hitch movement causes the implement 20 to pivot slightly around the implement top hitch pin 21 axis which then brings the bottom implement hitch pins 23 into engagement with the bottom guide structures 36. Once the implement bottom pins begin to engage guide structures 36, continued movement into the slots (engaging movement) causes rolling blocks 37 to pivot in the direction, shown as arrow "A" in FIGS. 4 and 5. As rolling blocks 37 pivot, a portion of the structure of each rolling block is positioned in its associated guide slot 36 to prevent movement of the hitch pin out of the guide slots 36 (disengaging movement). As the rolling blocks continue to pivot toward the engaged position, latch 38 is repositioned by spring force in the latching mechanism 41, in the direction shown as arrow "B" in FIGS. 4 and 5, to restrain the rolling block 37 in the engaged position with the implement hitch pin fully engaged.

Referring to FIG. 6, disengaging an implement from the quick coupler 30 is accomplished by repositioning latching lever 42 to the unlatched position. As latching lever 42 is moved to the unlatched position, shown as movement in the direction of arrow "C", actuator rod 46 is moved in an upward direction causing pivoting of latch 38 sufficient to allow rolling block 37 to pivot. When latching lever 42 is in the unlatched position, latch 38 is moved to a position apart from contact with rolling block 37 to allow rolling block 37 to pivot as the implement is disengaged. As rolling block 37 pivots, its outer contour will make contact with latch 38 so that once the bottom hitch pin 23 is fully disengaged from the guide structure 36 and the rolling block 37 reaches the released position, the rolling block 37 will be maintained in the released position until the next implement connection is made. Directions of linkage movement are indicated by arrows "D" while the direction of motion of the implement bottom hitch pin 23 is shown by arrow "E". Positioning the three-point hitch so that the implement rests on the ground and moving the tractor away from the implement will cause the bottom hitch pins 23 to be moved rearward with respect to the guide structures 36 causing rolling blocks 37 to rotate toward the disengaged position. Once the implement bottom hitch pins 23 are fully disengaged from guide structures 36, further lowering of the three-point hitch will allow top hook 35 to disengaged from the implement whereupon the tractor can be moved away from the implement.

Figure 7:
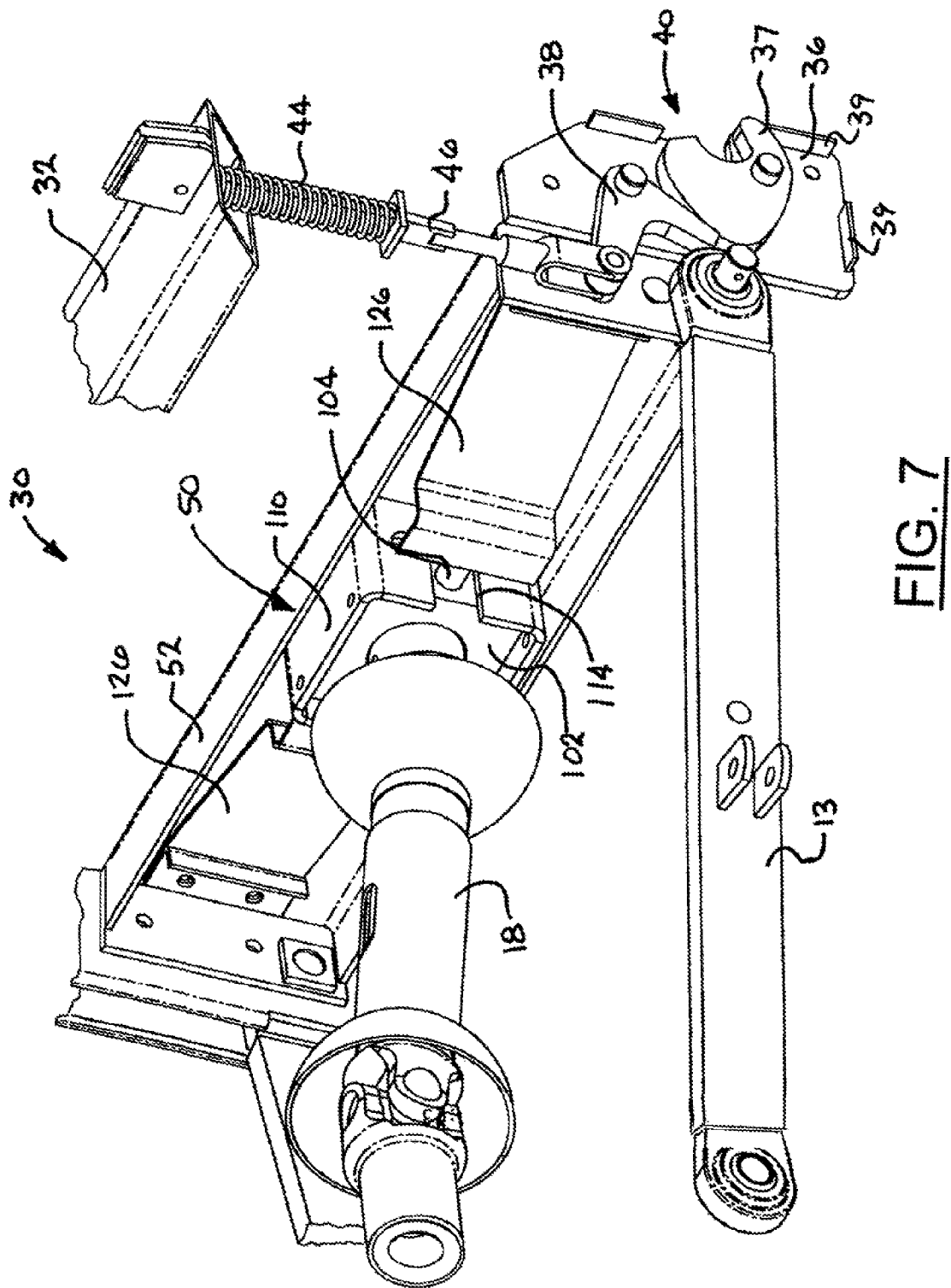
FIG. 7 is a partial perspective view of the invention showing the automatic latching mechanism in the unlatched position with the rolling block in the disengaged position and also details of the PTO coupler mechanism.

Referring now to FIG. 7, the forward end of the quick coupler 30 and PTO connection module 50 are isometrically presented. The connection module 50 comprises a movable thrust bearing housing 102 disposed within a bearing guide channel 110. Thrust bearing housing 102 supports a telescoping end of the PTO driveline telescoping shaft 18 and allows movement in both axial and radial directions. By allowing thrust bearing housing 102 to "float" radially, the connection module 50 provides a self-aligning design that enables the drive and driven members of torque coupler to be automatically positioned along a common axis of rotation as they are engaged. Thrust bearing housing 102 features a pair of opposing positioning tabs 104 extending from the outer periphery of the bearing housing 102 and extending through slotted guides 114 in opposing sides of the bearing guide channel 110 to allow the thrust bearing housing 102 to be moved rearwardly by action of PTO engagement springs 126. Rearward movement of the bearing housing 102 is limited by the configuration of slotted guides 114 so that the drive member of the torque coupling remains shielded by the transverse frame structure 52. Engaging a PTO-powered implement in the quick coupler 30 causes the bearing housing 102 to be moved forwardly against the force of engagement springs 126. PTO engagement springs are shown as leaf springs but those skilled in the art will recognize that many possible engagement spring designs and materials may be used to urge movement of the bearing housing 102. PTO telescoping shaft 18 accommodates the forward/rearward movement of the thrust bearing housing 102 and transfers rotational motion from the tractor PTO 18 to the implement via the torque coupler.

When an implement is connected, the driven member 80 of the torque coupling connected to the implement (shown in FIG. 2) moves toward the drive member 70 of the torque coupling as the implement pivots about the top hook bringing the bottom hitch pins into engagement with guide structures 36 (as previously described). The thrust bearing housing 102 is moved forward against the force of PTO engagement springs 126 once the driven member 80 contacts the drive member 70.

Referring now to FIGS. 8 and 9, an elevation view of a portion of the PTO connection module 50 is presented, including thrust bearing housing 102 and the bearing guide channel 110. Dimensions of the outer perimeter of thrust bearing housing 102 and the interior perimeter of the bearing guide channel 110 differ to create a small alignment gap 106 between the bearing housing 102 and the guide channel 110. Centering springs (not shown) may be used to retain the bearing housing 102 in a central position within the guide channel 110 and prevent unwanted vibration. The alignment gap 106 allows the drive member 70 of the PTO shaft torque coupler 60 to float (i.e., move in radial directions) in relation to the fixed structure of the guide channel 110 (which is attached to the quick coupler frame), that is to move radially relative to the shaft rotational axis.

FIG. 9 displays the drive member 70 and driven member 80 of the torque coupler 60. The drive member 70 is the endmost portion of the tractor side of the PTO driveline away from the tractor while the driven member 80 is typically disposed on an end of the implement driveline closest to the hitch. Driven member 80 includes a generally circular driven face 82 aligned perpendicularly to the axis of rotation 140 of the torque coupler 60. Alignment pin 84 is a cylindrically shaped structure centrally disposed along on the axis of rotation 140 and extends away from the surface of the driven face 82. Drive member 70 of torque coupler 60 comprises a generally circular drive face 72 matching the opposing driven face 82 on the coupler driven portion 80. Drive member 70 includes and an alignment pin receiver 74 configured to guide and receive alignment pin 84 as the separation between opposing drive and driven faces 72, 82 is reduced as the implement engages the quick coupler. Alignment pin receiver 74 is formed to provide a close-fitting receptacle for the alignment pin 84 so that the opposing members of the torque coupler 60 will be axially alignment when the torque coupler 60 is fully engaged. The alignment pin receiver 74 features a conically tapered region 76 adjacent to drive face 72 and concentrically aligned with the alignment pin receiver 74 to guide the alignment pin 84 toward an axially central position as the two portions of the coupler are moved toward engagement with each other as the implement is engaged on the quick coupler. In the event of misalignment in the torque coupler, the floating design of the coupler engagement apparatus 100 allows the drive member to move radially until its rotational axis aligns with axis of rotation 140.

Movement of driven member 80 toward drive member 70 causes alignment pin 84 to be directed toward alignment pin receiver 74. Interaction of conically tapered region 76 of the alignment pin receiver 74 and alignment pin 84 cause the drive member 70 to move radially with respect to the axis of rotation 140 in order to align both portions of the torque coupler 60 along on a single axis of rotation 140. This radial movement is accommodated by the limited degree of float allowed by the alignment gap 106 between the bearing guide channel 110 and the thrust bearing housing 102. As the separation between coupler drive and driven faces 72, 82 is reduced, driven rib 88, which extends away from and is radially oriented on driven face 82, will most likely contact the opposing drive face instead of aligning with the mating drive groove 78 on drive member 70. Only when both coupler members are perfectly rotationally aligned will driven rib 88 interlockingly engage drive groove 78 and allow full engagement of torque coupler 60. Drive groove 78 is shaped to receive driven rib 88 and fit such that, once engaged, the rib 88 and groove 78 interlock to prevent relative rotation between the drive and driven members 70, 80. Since it is unlikely that perfect rotational alignment of the coupler members 70, 80 will occur during the torque coupler engagement process, the PTO engagement springs 126 allow the thrust bearing housing to move axially while applying a force to maintain the coupler drive and driven members 70, 80 in contact until the PTO driveline is rotated by the tractor. The initial rotation of the drive member 70 will cause the drive member to rotate relative to driven member 80 until alignment of the driven rib 88 and drive groove 78 occurs, whereupon the spring force in the PTO engagement spring 126 will move the thrust bearing housing 102 rearward causing members 70, 80 to move into full engagement such that drive and driven faces 72, 82 are in contact and the driven rib 88 and drive groove 78 are fully engaged. The torque coupler is fully engaged when this occurs and rotational motion of the tractor PTO 18 is generally transferred to the implement 20.

Prior to engagement with a PTO-powered implement, the forward/rearward position of drive member 70 is established by the engagement springs 126 (shown in FIG. 7) urging the bearing housing 102 rearward until positioning tabs 104 contact the rearwardmost portion of slotted guides 114 (shown in FIG. 7). The configuration of slotted guides 114 maintains drive member such that it does not protrude rearwardly beyond the rearward face of transverse frame 52 and may be slightly recessed within the transverse frame 52 shown by dimension "H" in FIG. 9. By limiting the rearward movement of bearing housing 102, drive member 70 is shielded by the structure of transverse frame 52, even when no implement is coupled, thereby preventing inadvertent contact with a portion of a potentially rotating PTO driveline.

In another embodiment of the invention, the drive groove 78 and driven rib 88 are omitted. As drive and driven faces 72, 82 of the opposing coupler members move into contact with one, the resulting friction between the drive and driven members 70, 80 allows torque to be transferred through the coupler. Friction in the torque coupler 60 is created by the clamping force applied on the torque coupler 60 by the PTO engagement springs 126 and the coefficient of friction of the drive and driven faces 72, 82 of the coupler members 70, 80. Torque capacity may be altered by incorporating a friction increasing material (e.g., material having a higher coefficient of friction value) to one or both coupler member faces 72, 82, or by varying the spring force of the PTO engagement spring 126.

Figure 10:
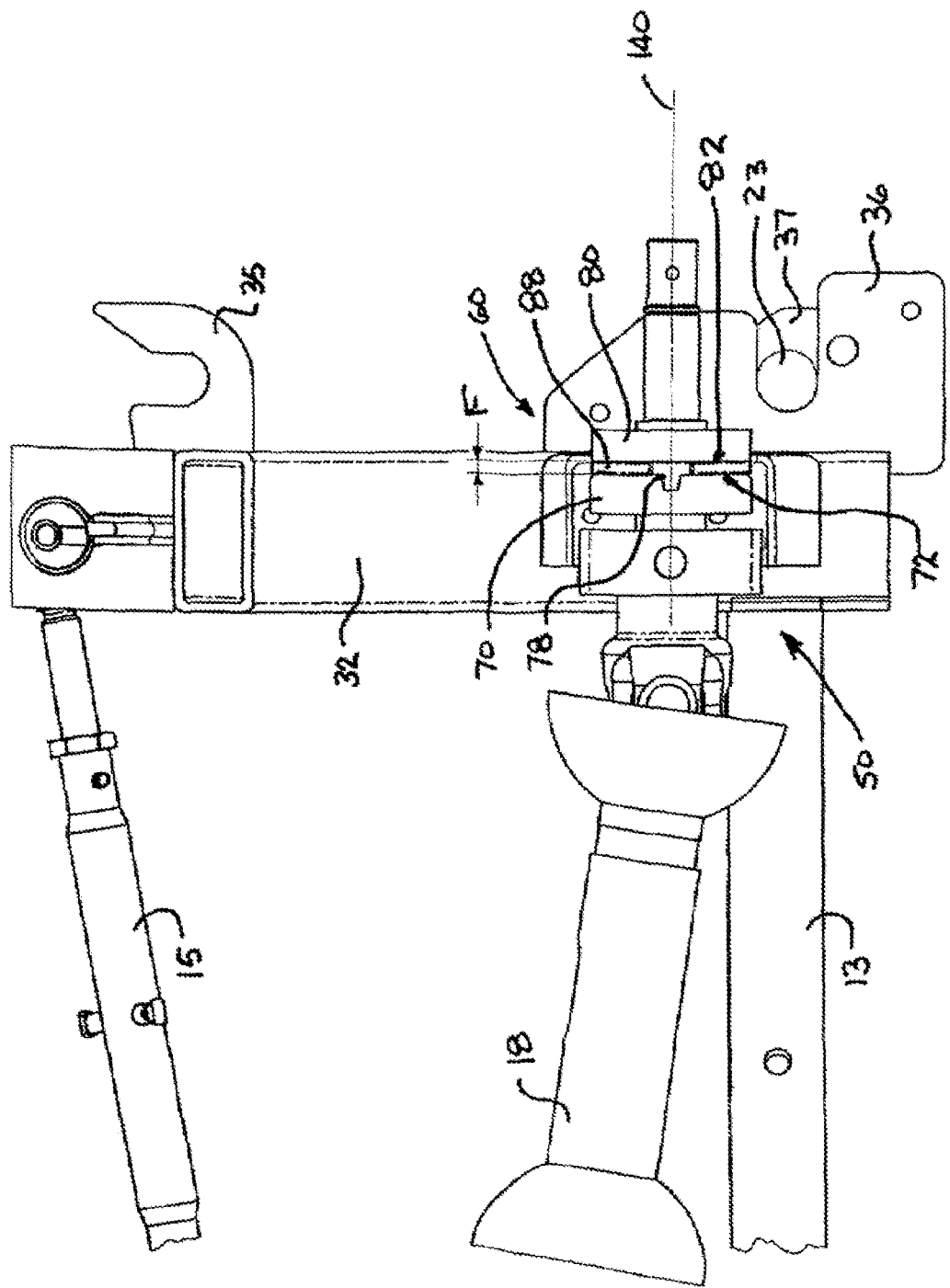
FIG. 10 is a partial side section view of the PTO coupler mechanism showing the drive and driven portions of the torque coupling engaged, but rotationally misaligned.
Figure 11:
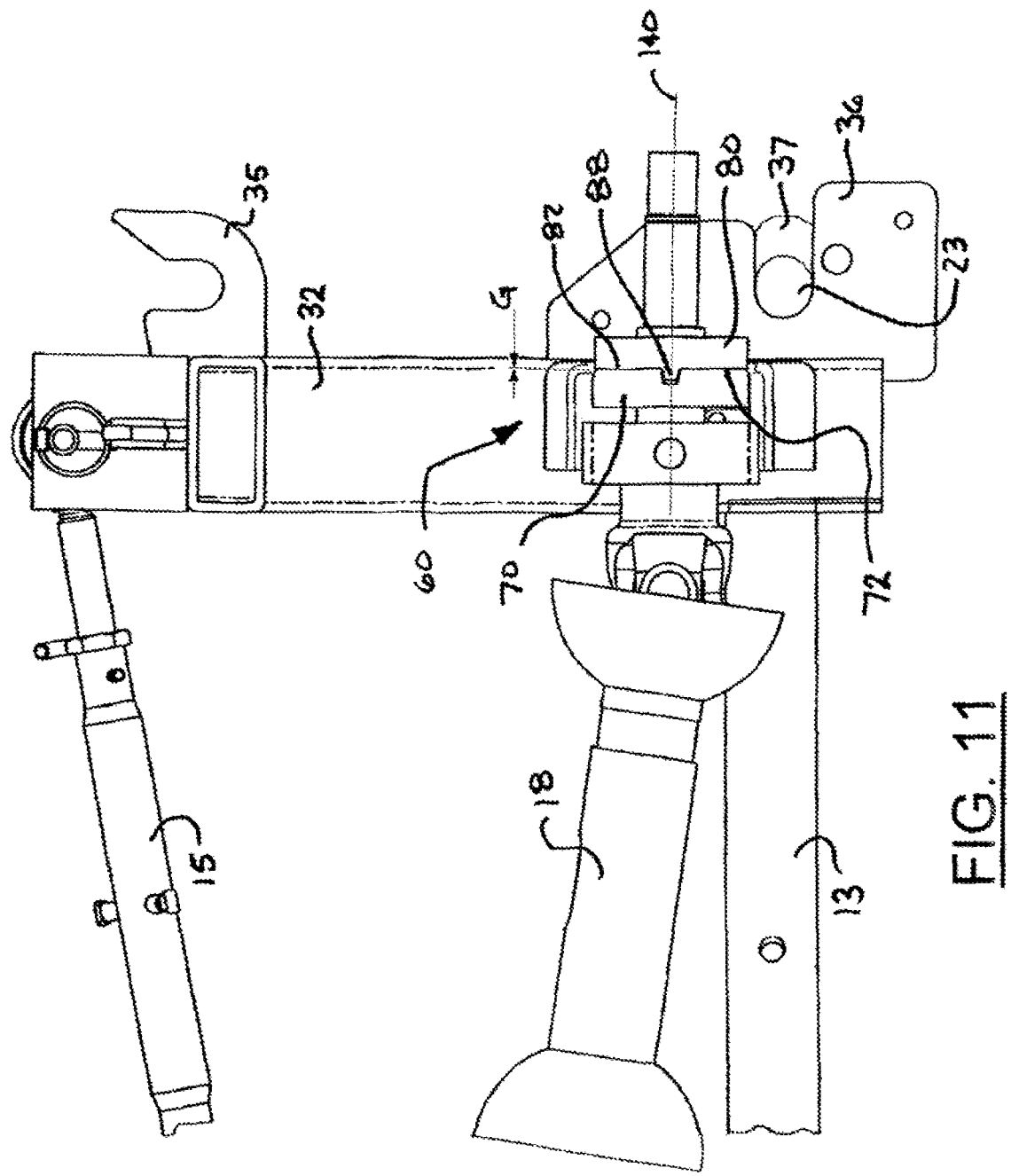
FIG. 11 is a partial side section view of the PTO coupler mechanism showing the drive and driven portions of the torque coupling engaged and rotationally aligned.

Referring now to FIGS. 10 and 11, PTO connection module 50 is shown with the implement in the engaged and latched position. In FIG. 10, torque coupler 60 is not rotationally aligned and thus cannot fully engage until one or both coupler portions rotate, illustrated as gap "F". Thrust bearing housing 102 is thus prevented from moving to the fully engaged (rearward) position. The force applied by PTO engagement springs 126 on the positioning tabs 104 urges the thrust bearing housing rearward in a direction urging engagement. As the drive member 70 is rotated, the spring force on the positioning tabs 104 urges the thrust bearing housing 102 further rearward toward the fully engaged position, thereby fully engaging the torque coupler 60. This full engagement of torque coupler 60 is shown in FIG. 11 wherein the torque coupler 60 is rotated for clarity, Gap "G," as shown, is substantially zero meaning the coupler faces 72, 82 are in contact.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention, however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A quick coupler for connecting a hitch-connectable implement to a tractor, the tractor having a three-point hitch and defining relative forward and opposing rearward directions with respect to the implement, the implement having an upper hitch pin and a pair of bottom hitch pins, said quick coupler comprising:

a main frame connectable to the tractor three-point hitch;

a top hook for engaging the upper implement hitch pin, said top hook connected to said main frame;

at least two releasable hitching mechanisms connected to opposing legs of said main frame, one said releasable hitching mechanism for association with each respective bottom hitch pin on the implement, said at least two releasable hitching mechanisms configured for receiving the implement bottom hitch pins as the frame-is rotated-with respect to the upper implement hitch pin engaged in the top hook and responsive to engaging movement of the three-point hitch, said mechanisms selectively positionable between latched and unlatched positions wherein said latched position enables the bottom hitch pins to be engaged in said at least two releasable hitching mechanisms, the hitching mechanisms are rotated from an open unlatched position into the closed latched position by pivotal contact with the bottom hitch pins and, once engaged, restrained in said at least two releasable hitching mechanisms in a manner enabling generally pivotal movement only, said unlatched position allowing the implement hitch pins to disengage from said at least two releasable hitching mechanisms in response to a disengaging movement of the three point hitch;

a transverse frame member mounted to said main frame and spanning between the opposing legs;

a telescoping shaft having first and second opposing ends and an axis of rotation, said first end connectable to a tractor PTO;

a PTO engagement mechanism connected to said transverse frame, said engagement mechanism having an engaged position and a disengaged position corresponding to respective forward and rearward positions along said axis of rotational of said second end of said telescoping shaft between said engaged and disengaged positions, said engagement mechanism connected to said transverse frame in a manner allowing rotational, axial, and limited radial movement of said second end of said telescoping shaft;

a torque coupler having separable drive and driven members, said drive member connected to said engagement mechanism for movement between said engaged and disengaged positions, said driven member connected to a mounting structure on the hitch-connected implement to allow rotational motion while constraining axial and radial movement of the driven member, both said members having interlocking alignment structures to radially align said drive member along said axis of rotation during movement toward said engaged position and;

the transverse frame having a forward and rearward face, the engagement mechanism mounted adjacent the forward face, the transverse frame having an opening therethrough such that the driven member is movable through the frame for engagement with the drive member, the PTO engagement mechanism having a guide limiting the movement of the drive member, the guide configured such that the drive member does not protrude beyond the rearward face of said transverse frame such that the drive member is shielded by the structure of the frame.

2. The quick coupler of claim 1, wherein each said releasable hitching mechanism further comprises a latching mechanism having a guide structure, a spring-assisted, lever-operated latch selectively movable between latched and unlatched positions, and a rolling block pivotally disposed within said guide structure and pivotable between a first and a second position, each said rolling block having a cam-like profile and a hook structure for restraining the implement bottom hitch pin when said rolling block is pivoted to a first position;

said rolling block, when positioned in a second position, allowing the implement bottom hitch pin to disengage from said at least two releasable hitching mechanisms;

said spring-assisted latch interacting between said rolling block and said guide structure to latch said rolling block in said first position and to unlatch said rolling block thereby allowing movement to said second position;

wherein prior to contacting an implement hitch pin, the rolling block when in the second position is prevented from moving into the first position by friction between the latch and the profile of the rolling block contacting the latch, wherein the latch is rotated towards the latched position while maintaining contact with the profile of the rolling block as the block is rotated about a pivot, below and forward of the midpoint of the hitch pins, from the second position to the first position and the latch applying a force against the rotation of the rolling block toward the first position; wherein in the engaged position the rolling block contacts a stop located below the pin establishing a forward rotation travel limit and the forward most portion of the latch contacts the rolling block rearward of the pin.

3. The quick coupler of claim 2, wherein said latching mechanisms are interconnected and movable between said latched and unlatched positions by a single actuator.

4. The quick coupler of claim 1, wherein said PTO engagement mechanism includes an engagement spring acting on said torque coupler to maintain said drive and driven members in contact when the implement is engaged with the quick coupler wherein the torque coupler can float forward against the force of the spring upon contact with the driven member.

5. The quick coupler of claim 4, wherein said drive and driven members of said torque coupler include a friction face which, when in said engaged position, transmits torque through said torque coupler.

6. The quick coupler of claim 4, wherein said drive and driven members include at least one interlocking drive groove and drive rib, respectively, which, when in said engaged position) prevent relative rotation between said drive and driven members.

7. The quick coupler of claim 6, wherein said torque coupler interlocking alignment structures comprise an alignment pin having an exterior profile aligned, when fully engaged, on said axis of rotation of said driven member, and an alignment receiver structure on said drive member, said alignment receiver structure having an interior contour matching said exterior profile of said alignment pin.

8. The quick coupler of claim 5, wherein said guide is a hollow bearing guide channel connected to said transverse frame and a thrust bearing housing disposed within said guide channel and movable in a generally linear direction between said engaged and said disengaged positions, said bearing having at least one positioning tab interacting with said engagement spring, said bearing guide channel having at least one slotted guide which interacts with said positioning tab thereby guiding movement of said thrust bearing housing and limiting linear travel to define said disengaged position of said thrust bearing housing, said channel guide further constraining said thrust bearing housing thereby accepting thrust forces applied on said thrust bearing housing by said telescoping shaft, said channel guide allowing radial movement of said thrust bearing housing thereby enabling said torque coupler portions to align when engaged.

9. The quick coupler of claim 8, further comprising:
the driven member mounting structure including an implement frame, a mounting plate and shields, wherein the driven member is connected to the mounting plate on the frame extending outwardly from the frame, the shields recessed such that the interlocking alignment structure of the driven members extends forwardly of a front edge of the shield;
wherein when the mounting structure is rotated about the upper pin within the top hook into a position generally parallel to the main frame the shields are directly adjacent to top and bottom portions of the transverse frame such that the driven member of the torque coupling is enclosed by the shields, transverse frame and the mounting plate.

10. The quick couple of claim 6, wherein said guide is a hollow bearing guide channel connected to said transverse frame and a thrust bearing housing disposed within said guide channel, said bearing having at least one positioning tab interacting with said engagement spring, said bearing guide having at least one positioning tab interacting with said engagement spring, said bearing guide channel having at least one slotted guide which interacts with said positioning tab thereby guiding movement of said thrust bearing housing in generally linear directions between said engaged and said disengaged positions, said slotted guide limiting linear travel of said thrust bearing housing to define said disengaged position, said channel guide further constraining said thrust bearing housing thereby accepting thrust forces applied on said thrust bearing housing by said telescoping shaft, said channel guide allowing radial movement of said thrust bearing housing thereby enabling said torque coupler portions to align when engaged.

11. The quick coupler of claim 10, further comprising the driven member mounting structure including an implement frame, a mounting plate and shields, wherein the driven member is connected to the mounting plate on the frame extending outwardly from the frame, the shields recessed such that the interlocking alignment structure of the driven members extends forwardly of a front edge of the shield;
Wherein when the mounting structure is rotated about the upper pin within the top hook into a position generally parallel to the main frame the shields are directly adjacent to top and bottom portions of the transverse frame such that the driven member of the torque coupling is enclosed by the shields, transverse frame and the mounting plate.

\* \* \* \* \*